United States Patent [19]
Tobinaga et al.

[11] Patent Number: 4,939,189
[45] Date of Patent: Jul. 3, 1990

[54] WATER-BORNE COATING COMPOSITION

[75] Inventors: Kenshiro Tobinaga, Kawanishi; Hiroyuki Sakamoto, Nishinomiya; Hiroshi Tsushima, Takatsuki; Yasuyuki Tsuchiya, Hirakata, al of Japan

[73] Assignee: Nippon Paint Co., Ltd., Osaka, Japan

[21] Appl. No.: 378,290

[22] Filed: Jul. 11, 1989

[30] Foreign Application Priority Data

Jul. 11, 1988 [JP] Japan ................................. 63-172454

[51] Int. Cl.$^5$ ............................ C08K 9/00; C08J 3/20
[52] U.S. Cl. .................................... 523/205; 523/204; 523/208; 523/209; 523/351
[58] Field of Search ............... 523/204, 205, 208, 209, 523/351; 428/407

[56] References Cited

U.S. PATENT DOCUMENTS

| | | | |
|---|---|---|---|
| 3,988,281 | 10/1976 | Minami et al. | 523/410 |
| 4,102,863 | 7/1978 | Buchwalter et al. | 525/523 |
| 4,277,383 | 7/1981 | Hayashi et al. | 524/541 |
| 4,540,725 | 9/1985 | Jerabek et al. | 523/351 |

*Primary Examiner*—Lewis T. Jacobs
*Assistant Examiner*—E. J. Webman
*Attorney, Agent, or Firm*—Wenderoth, Lind & Ponack

[57] ABSTRACT

Disclosed is a water-borne coating composition having improved pigment dispersibility. The water-borne coating composition comprises a pigment and a water dispersible or water soluble resin, wherein said pigment is preliminary ground with crosslinked resin particles having ionic groups on the surface.

4 Claims, No Drawings

WATER-BORNE COATING COMPOSITION

FIELD OF THE INVENTION

The present invention relates to a water-borne coating composition. It particularly relates to a water-borne coating composition in which pigment is ground with crosslinked resin particles having ionic groups on the surface.

1. Background of the Invention

Since pigment is generally solid materials, it is very difficult to disperse it into paint and many efforts have been made to improve the dispersibility. If the dispersibility of pigment is poor, the pigment agglomerates to cause sealing, separation, color change or color shading. It may also provide dull surface or rough surface.

In order to enhance the dispersibility, pigment is preliminary ground with a resin for paint to form a pigment paste which is then formulated into a paint composition. It is believed that the resin for paint is bonded to pigment's surface by adsorption power, hydrogen bond and the like to enhance the dispersibility.

In this method, however, the bonded power is very weak to easily separate the bond. It therefore often raises agglomeration and separation.

2. Summary of the Invention

The present invention provides a water-borne coating composition having improved pigment dispersibility. The water-borne coating composition comprises a pigment and a water dispersible or water soluble resin, wherein said pigment is preliminary ground with crosslinked resin particles having ionic groups on the surface.

DETAILED DESCRIPTION OF THE INVENTION

The pigment can be any type of organic or inorganic pigments used in this field. Typical examples of the inorganic pigments are titanium oxide, zinc oxide, carbon black, silicate, basic lead silicate, kaolin, calcined kaolin, cadmium yellow, cadmium red, iron oxide red, cobalt blue, aluminum powder, bronze powder and the like. Typical examples of the organic pigments are phthalocyanine green, phthalocyanine blue and the like.

The crosslinked resin particles employed in the present invention are those having ionic groups on the surface. The resin particles can be prepared by various methods, such as emulsion polymerization, suspension polymerization, a method wherein crosslinking is conducted after forming resin emulsion, a method wherein polymerized resin is ground, and the like. An average particle size of the resin particles is preferably within the range of 10 to 1,000 nm, more preferably within the range of 50 to 200 nm, which are measured by a light scattering method.

Preferred resin particles are prepared by emulsifying in an aqueous medium a resin composition comprising (A) 100 parts by weight of a cationic or anionic film-forming aqueous resin, and (B) 10 to 250 parts by weight of a thermosetting crosslinking agent which is self-crosslinked or crosslinked with said aqueous resin (A) in terms of condensation or addition reaction, parts by weight being based on the solid content of the resin composition, and then heating the resultant emulsion to above a crosslinkable temperature of the crosslinking agent (B).

The anionic aqueous resin includes maleic natural drying oil, maleic synthetic drying oil, maleic polybutadiene, a half ester or half amide thereof, an anionic acryl resin and the like. Maleic oil can be prepared by reacting 30 to 300 mmol of maleic anhydride with 100 g of natural drying or semi-drying oil, or synthetic drying or semi-drying oil having an iodine value of more than 100. Maleic polybutadiene can be prepared by reacting 30 to 300 mmol of maleic anhydride with 100 g of liquid polybutadiene. Maleic drying oil or maleic polybutadiene may be modified with water, an alcohol, a primary or secondary amine to form a half ester or a half amide which can be used in the present invention. The anionic acryl resin may be prepared by polymerizing a (meth)acrylic ester with an ethylenic unsaturated monomer having an acid group, and if desired the other ethylenic unsaturated monomer. Typical examples of the (meth)acrylic esters are methyl (meth)acrylate, ethyl (meth)acrylate, butyl (meth)acrylate, hexyl (meth)acrylate, 2-ethylhexyl (meth)acrylate, lauryl (meth)acrylate, 2-hydroxyethyl (meth)acrylate and glycidyl (meth)acrylate. (Meth)acrylate herein means both methacrylate and acrylate. The ethylenic unsaturated monomer having an acid group includes (meth)acrylic acid, crotonic acid, itaconic acid, maleic anhydride, sulfoacrylate and mono(2-hydroxyethylacrylate)acid phosphate. Typical examples of the other ethylenic unsaturated monomers are styrene, vinyltoluene, acrylonitrile, acrylamide, vinyl acetate and the like. A commercially available water-soluble acryl resin, such as Coatax WE-804 and WE-832 from Toray Co., Ltd. may be employed.

Typical example of the cationic film-forming aqueous resin (A) is a polybutadiene having amine groups (aminated polybutadiene). The resin may be prepared by treating liquid polybutadiene with peracetate to form oxirane oxygen, and then reacting with a primary or secondary amine.

The crosslinking agent (B) of the present invention can be self-crosslinked or crosslinked with the aqueous resin (A). The agent (B) for anionic type includes a melamine resin, a methylol phenol, an etherified methylol phenol and the like. The agent (B) for cationic type includes a methylol phenol, etherified methylol phenol and the like. If the cationic resin (A) is the aminated polybutadiene, tetrabromobisphenol A can be employed.

The melamine resin can be a methylol melamine prepared by reacting a mixture of melamine, benzoguanamine, acetoguanamine and the like with formaldehyde. It can also be one wherein a portion of methylol groups was etherified with $C_1$ to $C_4$ alkanol.

The methylolphenol is one obtained by reacting a phenol, such as phenol, p-cresol, p-t-butylphenol, amylalcohol, p-phenylphenol and bisphenol A, with formaldehyde in the presence of an alkali catalyst. The etherified methylolphenol is generally prepared by partially or completely etherifying the phenolic OH group of the methylolphenol with a suitable etherifying agent. Examples of the etherifying agents are a monoepoxy compound, and a compound having the following formula:

$$R-X$$

wherein R represents methyl, allyl, benzyl, oxirane and the like, and X represents a halogen atom. In case where the etherifying agent is the monoepoxy compound, the product reacted is beta-hydroxyphenol ether which is highly reactive and this is preferred.

The resin particles may be prepared by dispersing or emulsifying an ionic resin (C) and a resin (D) having at least two polymerizable vinyl groups in one molecule in an aqueous medium and then radically polymerizing. A resin (E) having both ionic groups and at least two vinyl groups may be used and treated as the resins (C) and (D) to form the crosslinked resin particles of the present invention.

The ionic resin (C) may be selected from the resin (A) mentioned above. The resin (D) has at least two vinyl groups in one molecule and preferably has a molecular weight of 400 to 200,000, more preferably 1,000 to 10,000. A principal backbone of the resin (D) is not limited, but preferred epoxy resin, polyester resin, alkyd resin, polyurethane resin, amino resin and the like. Vinyl groups can be introduced into the principal backbone by known methods. For example, the epoxy groups of an epoxy resin may be esterified by acrylic acid or methacrylic acid. A resin having less than two vinyl groups may be mixed with the resin (B) in an amount not to adversely affect on the reactivity.

The resin (E) should have both ionic groups and at least two vinyl groups. It can be prepared by reacting a primary or secondary amine with a polyglycidyl compound, followed by reacting with an acid having a polymerizable vinyl group, such as (meth)acrylic acid. Examples of the polyglycidyl compounds are epi-bis type epoxy resin, novolak type epoxy resin, epoxy group-containing polybutadiene and the like.

The crosslinking agent (B) and the resins (D) and (E) is crosslinked at a temperature of less than 100° C. at normal pressures, because they are crosslinked in an aqueous medium. However, if the crosslinking reaction is carried out in an autoclave, the compounds which are reactive more than 100° C. can be employed.

According to the present invention, the crosslinking reaction is carried out in an aqueous medium. By the term "aqueous medium" herein is meant water or a mixture of water and another water-miscible solvent (e.g. a lower alcohol, an ether etc.). For lowering the viscosity of the resin composition and emulsifying with ease, the aqueous medium may further contain an organic solvent. Typical examples of the organic solvents are xylene, toluene, methyl isobutyl ketone, hexane, carbon tetrachlordie, 2-ethylhexanol, isophorone, cyclohexane, benzene and the like. It is preferred that the organic solvent is azeotropically removed after forming an emulsion and before crosslinking. The aqueous medium may further contain a surfactant to promote emulsification. Typical examples of the surfactants are a nonionic surfactant, such as polyethyleneglycol alkylphenyl ether, polyethyleneglycol alkyl ether, polyoxyalkylene alkyl ether, polyethyleneglycol sorbitan monostearate and polypropyleneglycol polyethyleneglycol ether: an anionic surfactant, such as polyoxyethylene alkylphenyl ether sulfate ammonium salt and polyoxyethylene alkyl ether sulfate ammonium salt; a cationic surfactant, such as lauryltrimethylammonium chloride, distearyldimethylammonium chloride and alkylpicolinium chloride. When the aqueous resin has anionic groups, the nonionic or anionic surfactant is preferred in view of stability. When the aqueous resin has cationic groups, the nonionic or cationic surfactant is preferred.

The crosslinking reaction can be assisted by a catalyst or a polymerization initiator. Examples of the catalysts of a melamin resin are dinonylnaphthalenesulfonic acid, dinonylnaphthalenedisulfonic acid and the like. Examples of the initiators are an azo compound, a peroxide and the like.

If desired, a curing agent for the coating composition may be added in the resin emulsion obtained above. In this case, a dispersing process of the curing agent can be simultaneously done with the grinding process of the pigment. Typical examples of the curing agents are a metal salt, such as manganese acetate, cobalt acetate, lead acetate, manganese naphthenate, cobalt naphthenate, manganese octanate, cobalt octanate, dibutyltin dilaurate and dibutyltin dioctoate; a metal oxide, such as manganese dioxide and dibutyltin oxide; an organic acid, such as dinonylnaphthalenesulfonic acid and dinonylnaphthalenedisulfonic acid; and the like.

The resin emulsion can be prepared by neutralizing at least 20 mol % of the ionic groups of the ionic resin and then adding the aqueous medium and the other components thereto. The neutralization is carried out with an acid for the anionic groups and a base for the cationic groups. The acid includes acetic acid, propionic acid, lactic acid and the like. The base includes ammonia, diethanolamine, triethanolamine, methylethanolamine, N,N-dimethylethanolamine, N,N-diethylethanolamine, diethylamine, triethylamine, morphorine, potassium hydroxide and the like.

The obtained resin emulsion is heated to above a crosslinkable temperature under normal pressures or increased pressures to form an aqueous dispersion of micro particles.

The polymers in the emulsion have electric charges on the surface and stably dispersed in water due to their repulsion forces. The emulsion containing the polymers is very stable to heat and therefore can proceed the crosslinking reaction of the crosslinking agent (B) or the resins (D) and (E). The termination of the crosslinking reaction can be identified by adding a solvent capable of dissolving a resin, such as tetrahydrofuran. When a crosslinking reaction does not occur, the emulsion turns to transparent, and if a crosslinking reaction is proceeded, the solution turns to turbid white.

Where a catalyst which is not soluble in a solvent is contained, the obtained particles are rinsed with a large amount of tetrahydrofuran and dried by air and then at a reduced pressure. The resin particles can be identified using a microscope.

Grinding process of the pigment can be any methods used in this field. For example, the pigment and the crosslinked resin particles are ground with glass beads to form a pigment paste.

The water-borne coating composition of the present invention contains the above mentioned pigment paste and the water dispersible or water soluble resin. The water dispersible or water soluble resin can be the cationic or anionic film-forming resin (A) mentioned above. Another water dispersible or water soluble resin may also be employed. Examples of such resins are aminated epoxy resin, aminated acryl resin, aminated polyester, aminated polyurethane resin, carboxylated polyester resin, carboxylated epoxy resin and the like. The resin is neutralized with a suitable neutralizing agent before formulating into the composition. The pigment content of the coating composition is usually expressed as pigment-to-resin ratio. In the practice of the present invention, pigment-to-resin ratios within the range of 1:2 to 1:20 are usually used.

The water-borne coating composition can be coated by known methods, such as electrocoating, dipping, flow coating and the like. Electrocoating is very preferred. In case where electrocoating is adopted, the composition adjusts a solid content of 10 to 20% by weight and then is coated to form a dried film thickness of 15 to 30 micron. The electrocoated film is baked to cure at a temperature of 120 to 200° C. for 10 to 60 minutes.

In the water-borne coating composition, a pigment is ground with particular resin particles and therefore is coated with the resin particles. The pigment is stably present in the composition without agglomeration. If a curing agent is incorporated into the resin emulsion, the obtained pigment paste can have additional function, e.g. catalytic function.

EXAMPLES

The present invention is illustrated by the following Examples which are not construed as limiting the invention to their details.

REFERENCE EXAMPLE 1

Preparation of polybutadiene having amino groups (aminated polybutadiene)

Polybutadiene having an average molecular weight of 2,000 and 1.2 bond of 65% (available from Nippon oil Company Ltd. as Nisseki Polybutadiene B-2,000) was treated with peracetate to obtain epoxidized polybutadiene having an oxirane oxygen content of 6.4%.

A 2 liter autoclave was charged with 1,000 g of the epoxidized polybutadiene and 354 g of ethyleneglycol monoethyl ether, to which 62.1 g of dimethylamine was added and reacted at 150° C. for 5 hours. After distilling unreacted amine away, it was cooled to 120° C. and a mixture of 79.3 g of acrylic acid, 7.6 g of hydroquinone and 26.4 g of ethyleneglycol monoethyl ether was added and reacted at 120° C. for 3¾ hours. The obtained resin had an amine value of 85.2 mmol/100 g, an acid value of 10.0 mmol/100 g and a solid content of 75.4%.

REFERENCE EXAMPLE 2

Epoxyacrylate resin

One thousand parts by weight of a bisphenol type epoxy resin having an epoxy equivalent of 950 (available from Yuka Shell Epoxy Co., Ltd. as Epicoat 1,004) was dissolved in 343 parts by weight of ethyleneglycol monoethyl ether, to which 76.3 parts by weight of acrylic acid, 10 parts by weight of hydroquinone and 5 parts by weight of N,N-dimethylamino ethanol were added and reacted at 100° C. for 5 hours to obtain a resin solution. The resin had an acid value of 2 mmol/100 g and a solid content of 75%.

REFERENCE EXAMPLE 3

Cationic emulsion 400 g of the aminated polybutadiene of Reference Example 1 was mixed with 240 g of the epoxyacrylate resin of Reference Example 2 and neutralized with 8.0 g of acetic acid. Then, a solution of 8.0 g of manganese acetate and deionized water was added slowly thereto to form a cationic emulsion having a solid content of 33% by weight.

REFERENCE EXAMPLE 4

Preparation of aminated epoxy resin 1,900 parts by weight of Epicoat 1004 (bisphenol type epoxy resin having an epoxy equivalent of 950 available from Yuka Shell Epoxy Co., Ltd.) was dissolved in 685.3 parts by weight of xylene, to which 112.7 parts by weight of n-methylethanolamine was added and reacted at 130° C. for three hours.

Thereafter, 2.1 parts by weight of hydroquinone and 0.6 parts by weight of quinone were added and mixed and, after an addition of 43.1 parts by weight of methacrylic acid, reacted at 110° C. for three hours. Then, 216 parts by weight of methyl isobutyl ketone was added to obtain an aminated epoxy resin. The resin had an amine value of 73 mmol/100 g solid and a solid content of 70%.

EXAMPLE 1

One hundred parts by weight of the aminated polybutadiene of Reference Example I was mixed with 33.3 parts by weight of a resol type phenol resin (available from Arakawa Chemical Industries, Co., Ltd. as Tamanol 722), and then mixed with 2.8 parts by weight of glacial acetic acid. Next, 0.20 parts by weight of cobalt acetate tetrahydrate and 0.45 parts by weight of manganese acetate tetrahydrate were added and mixed. Deionized water of 363 parts by weight was added thereto and emulsified to form a resin emulsion. The resin emulsion was transparently dissolved in tetrahydrofuran.

The solvent was removed under a reduced pressure while adding deionized water. The emulsion was then kept at 55° C. for 7 days and cooled to form a cationic resin particle dispersion. This dispersion was not dissolved in tetrahydrofuran to form a white semiopaque solution.

The obtained dispersion of 400 parts by weight was mixed using a disper with 3.0 parts by weight of carbon black (available from Mitsubishi Kasei Corp. as Carbon No. 5B), 11.0 parts by weight of basic lead silicate, 68 parts by weight of calcined kaolin and 18.0 parts by weight of titanium dioxide. Glass beads were added and ground for one hour by an SG mill to form a pigment paste having a solid content of 35.7% and a maximum particle of 10 micrometer.

An electrocoating paint was prepared by mixing 347.3 parts by weight of the pigment paste obtained above, 835.9 parts by weight of the cationic emulsion of Reference Example 3 and 816.8 parts by weight of deionized water. In the paint, a degreased steel panel was cationically electrocoated. The coated article was baked at 185° C. for 25 minutes to form a coating of 20 micrometer. The electrocoating paint was subjected to a test for resistance to agglomeration and the result is shown in Table 1. The coated film was subjected to an impact resistance test and the result is shown in Table 1.

COMPARATIVE EXAMPLE 1

An experiment was conducted as generally described in Example 1, with the exception that the resin emulsion was not heated. The results of the same tests are shown in Table 1.

COMPARATIVE EXAMPLE 2

An experiment was conducted as generally described in Example 1, with the exception that the resin emulsion was prepared without Tamanol 722. The results of the same tests are shown in Table 1.

REFERENCE EXAMPLE 5

Etherified methylol phenol

An etherified methyl phenol was prepared from the following ingredients.

| Ingredients | Parts by weight |
| --- | --- |
| Tamanol 722[1] | 60 |
| Butyl glycidyl ether | 23 |
| n-Butanol | 10 |
| Methoxybutanol | 10 |
| Dimethylbenzylamine | 0.4 |

[1] A resol type phenol resin available from Arakawa Kagaku K.K.

Tamanol 722 was charged in a reaction vessel to which methoxybutanol and n-butanol were added and then butyl glycidyl ether was added. The content was mixed uniformly and a temperature rises to 100° C., at which temperature dimethylbenzylamine was added to the content. Mixing was continued at 100° C. for 3 hour with paying attention to a rapid elevation of temperature, after which an amount of glycidyl group of the reaction product was measured to find less than 5% of the charged amount. The content was cooled to conduct an analysis. The analysis showed that phenolic OH group disappears and beta-hydroxyphenol ether compound having a methylol group and a secondary alcohol group was obtained.

EXAMPLE 2

An experiment was conducted as generally described in Example 1, with the exception that the methylol phenol of Reference Example 5 of 60 parts by weight was employed instead of Tamanol 22 of 33.3 parts by weight. The results of the resistance to agglomeration test are shown in Table 1.

COMPARATIVE EXAMPLE 3

An experiment was conducted as generally described in Example 2, with the exception that the resin emulsion was not heated. The results of the same test are shown in Table 1.

EXAMPLE 3

An experiment was conducted as generally described in Example 1, with the exception that 50 parts by weight of tetrabromobisphenol A was employed instead of Tamanol 722 of 33.3 parts by weight. The results of the resistance to agglomeration test are shown in Table 1.

COMPARATIVE EXAMPLE 4

An experiment was conducted as generally described in Example 3, with the exception that the resin emulsion was not heated. The results of the same test are shown in Table 1.

EXAMPLE 4

A resin emulsion was prepared from the following ingredients:

| Ingredients | Parts by weight | solid content |
| --- | --- | --- |
| The aminated polybutadiene resin of Reference Example 1 | 80 | 60 |
| The epoxyacrylate resin of Reference Example 2 | 53.3 | 40 |
| Glacial acetic acid | 2.0 | |
| Azobisisobutylonitrile | 3.0 | |
| Deionized water | 361.7 | |

The aminated polybutadiene of Reference Example 1 was mixed with the epoxyacrylate resin of Reference Example 2, and then mixed with glacial acetic acid. Next, azobisisobutylonitrile was added and mixed. Deionized water was added thereto and emulsified to form a resin emulsion. The resin emulsion was transparently dissolved in tetrahydrofuran.

The emulsion was then kept at 55° C. for 7 days and cooled to form a cationic resin particle dispersion. This dispersion was not dissolved in tetrahydrofuran to form a white semiopaque solution.

A tin plate was dipped in the resin particle dispersion having a solid content of 10% and taken out. The plate was dried in the air and dried at room temperature under a reduced pressure. It was then observed by a microscope to find resin particles having less than 100 nm on the surface.

The obtained dispersion of 400 parts by weight was mixed using a disper with 3.0 parts by weight of carbon black (available from Mitsubishi Kasei Corp. as Carbon No. 5B), 11.0 parts by weight of basic lead silicate, 68 parts by weight of calcined kaolin and 18.0 parts by weight of titanium dioxide. Glass beads were added and ground for one hour by an SG mill to form a pigment paste having a solid content of 36.7% and a maximum particle of 10 micrometer.

An electrocoating paint was prepared by mixing 347.3 parts by weight of the pigment paste obtained above, 835.9 parts by weight of the cationic emulsion of Reference Example 3 and 816.8 parts by weight of deionized water. In the paint, a degreased steel panel was cationically electrocoated. The coated article was baked at 185° C. for 5 minutes to form a coating of 20 micrometer. The electrocoating paint was subjected to a test for resistance to agglomeration and the result is shown in Table 1.

EXAMPLE 5

A resin emulsion was prepared from the following ingredients:

| Ingredients | Parts by weight | solid content |
| --- | --- | --- |
| The aminated polybutadiene resin of Reference Example 4 | 143 | 100 |
| The epoxyacrylate resin of Reference Example 2 | 107 | 80 |
| Glacial acetic acid | 3.0 | |
| Azobisisobutylonitrile | 2.0 | |
| Deionized water | 645 | |

The aminated polybutadiene of Reference Example 4 was mixed with the epoxyacrylate resin of Reference Example 2, and then mixed with glacial acetic acid. Next, azobisisobutylonitrile was added and mixed. Deionized water was added thereto and emulsified to form a resin emulsion. The resin emulsion was transparently dissolved in tetrahydrofuran.

The emulsion was then kept at 55° C. for 3 days and cooled to form a cationic resin particle dispersion. This dispersion was not dissolved in tetrahydrofuran to form a white semiopaque solution.

An electrocoating paint was prepared using the above obtained dispersion as generally described in Example 4 and the same test was done. The result is shown in Table 1.

EXAMPLE 6

A resin emulsion was prepared from the following ingredients:

| Ingredients | Parts by weight | solid content |
|---|---|---|
| The aminated polybutadiene resin of Reference Example 1 | 80 | 60 |
| Glacial acetic acid | 2.0 | |
| Azobisisobutylonitrile | 3.0 | |
| Deionized water | 215 | |

The aminated polybutadiene of Reference Example 1 was mixed with glacial acetic acid while keeping at 55° C. Next, azobisisobutylonitrile was added and mixed. Deionized water was added thereto and emulsified to form a resin emulsion. The resin emulsion was transparently dissolved in tetrahydrofuran.

The emulsion was then kept at 55° C. for 3 days and cooled to form a cationic resin particle dispersion. This dispersion was not dissolved in tetrahydrofuran to form a white semiopaque solution.

An electrocoating paint was prepared using the above obtained dispersion as generally described in Example 4 and the same test was done. The result is shown in Table 1.

COMPARATIVE EXAMPLE 5

An electrocoating paint was prepared as generally described in Example 4, with the exception that the resin emulsion was prepared without azobisisobutylonitrile. The result is shown in Table 1.

COMPARATIVE EXAMPLE 6

An electrocoating paint was prepared as generally described in Example 5, with the exception that the resin emulsion was prepared without azobisisobutylonitrile. The result is shown in Table 1.

REFERENCE EXAMPLE 6

Maleic Polybutadiene resin

A maleic polybutadiene resin was prepared from the following ingredients.

| Ingredients | Weight (g) |
|---|---|
| Nisseki Polybutadiene B-1500[1] | 1000 |
| Antigen 6C[2] | 10 |
| Maleic anhydride | 250 |
| Deionized water | 20 |
| Diethylamine | 0.5 |
| Propylene glycol | 100 |
| Ethylene glycol monoethyl ether | 340 |

[1]Polybutadiene having Mn 1500, vinyl 65%, trans 14% and cis 16, available from Nippon Petrochemicals Co., Ltd.
[2]N-methyl-N'-(1,3-dimethylbutyl)-p-phenylenediamine available from Sumitomo Chemical Industries, Inc.

Nisseki Polybutadiene B-1500 was charged in a 2 liter flask having a condenser to which Antigen 6C and maleic anhydride were added. The content was kept at 190° to 200° C. with stirring to conduct an addition reaction of maleic acid to polybutadiene. After about 5 hours from the beginning of the heating, it was identified by a color reaction of dimethylaniline to finish the addition reaction. The reaction mixture was cooled to 100° C., and a mixture of deionized water and diethylamine was added dropwise over about 30 minutes. After finishing the addition, mixing continued for about one hour to obtain an acid value of 140. Then, propylene glycol was added to the reaction mixture and the reaction was conducted at 110° C. for 3 hours to obtain an acid value of 125. Next, ethylene glycol monoethyl ether was added and mixed at 80° C. for about one hour to finish a synthesis. The obtained vanish had a nonvolatile content of 80%.

REFERENCE EXAMPLE 7

Anionic emulsion

| Ingredients | Parts by weight |
|---|---|
| The maleic polybutadiene resin | 100.0 |
| Triethylamine | 7.9 |
| Deionized water | 157.0 |

The maleic polybutadiene resin was mixed with triethylamine and deionized water was mixed to emulsify. The obtained emulsion had a solid content of 30.2%.

EXAMPLE 7

A resin emulsion was prepared from the following ingredients:

| Ingredients | Parts by weight |
|---|---|
| The maleic polybutadiene resin of Reference Example 6 | 80 |
| The etherified methylolphenol of Reference Example 5 | 117.6 |
| Triethylamine | 9.8 |
| Deionized water | 361.7 |

The maleic polybutadiene of Reference Example 6 was mixed with the etherified methylolphenol of Reference Example 5 and triethylamine. Deionized water was added thereto and emulsified to form a resin emulsion. The resin emulsion was transparently dissolved in tetrahydrofuran.

The solvent was azeotropically distilled under a reduced pressure with adding deionized water. The emulsion was then kept at 55° C. for 7 days and cooled to form an anionic resin particle dispersion. This dispersion was not dissolved in tetrahydrofuran to form a white semiopaque solution.

The obtained dispersion of 400 parts by weight was mixed using a disper with 6.3 parts by weight of triethylamine, 6.9 parts by weight of carbon black, 59 parts by weight of titanium dioxide, 20 parts by weight of lead silicate, 12 parts by weight of strontium chromate and 3 parts by weight of electrolytic manganese dioxide. Glass beads were added and ground for one hour by an SG mill to form a pigment paste having a solid content of 35.2% and a maximum particle of 10 micrometer.

An electrocoating paint was prepared by mixing 51.1 parts by weight of the pigment paste obtained above, 271.5 parts by weight of the anionic emulsion of Reference Example 7 and 177.4 parts by weight of deionized water. In the paint, a degreased steel panel was anionically electrocoated. The coated article was baked at 185° C. for 25 minutes to form a coating of 20 micrometer. The electrocoating paint was subjected to a test for resistance to agglomeration and the result is shown in Table 1.

COMPARATIVE EXAMPLE 7

An experiment was conducted as generally described in Example 7, with the exception that the resin emulsion was not heated. The result of the same test is shown in Table 1.

EXAMPLE 8

An experiment was conducted as generally described in Example 7, with the exception that 100 parts by weight of a melamine resin (available from Mitsui Toatsu Chemical Co., Ltd. as Uban 22 R) was employed instead of 117.7 parts by weight of the etherified methylolphenol of Reference Example 5. The result of the same test is shown in Table 1.

COMPARATIVE EXAMPLE 8

An experiment was conducted as generally described in Example 8, with the exception that the resin emulsion was not heated. The result of the same test is shown in Table 1.

EXAMPLE 9

An experiment was conducted as generally described in Example 7, with the exception that 200 parts by weight of an anionic acryl resin (available from Toray Co., Ltd. as Coatax WE-804) was employed instead of the maleic polybutadiene resin, an amount of triethylamine was changed from 9.8 to 3.1 parts by weight and an amount of deionized water was changed from 584 to 646.9 parts by weight. The result of the same test is shown in Table 1.

COMPARATIVE EXAMPLE 9

An experiment was conducted as generally described in Example 9, with the exception that the resin emulsion was not heated. The results of the same tests are shown in Table 1.

TABLE 1

|  | Resistance to agglomeration[a] | Impact resistance[b] |
| --- | --- | --- |
| Examples |  |  |
| 1 | Good | Good |
| 2 | Good |  |
| 3 | Good |  |
| 4 | Good |  |
| 5 | Good |  |
| 6 | Good |  |
| 7 | Good |  |
| 8 | Good |  |
| 9 | Good |  |
| Comparative Example |  |  |
| 1 | Extremely | Extremely |
| 2 | Bad | Bad |
| 3 | Extremely bad |  |
| 4 | Extremely bad |  |
| 5 | Extremely bad |  |
| 6 | Extremely bad |  |
| 7 | Extremely bad |  |
| 8 | Extremely bad |  |
| 9 | Extremely bad |  |

[a] A paint was kept at 40° C. for 7 days with stirring and then filtered with a 300 mesh wire gauze. Good shows substantially no filtered residue, extremely bad shows much filtered residue and bad shows an intermediate therebetween.
[b] A coated panel was subjected to an impact resistant test under the conditions of ½ inches, 500 g and 5 cm and a degree of peeling was observed by eyes. Good shows no peeling, bad shows little peeling and extremely bad shows much peeling.

What is claimed is:

1. A water-borne coating composition comprising a pigment and a water dispersible or water soluble resin, wherein said pigment is preliminarily ground with crosslinked resin particles having ionic groups on the surface.

2. The water-borne coating composition according to claim 1 wherein said crosslinked resin particles are prepared by emulsifying in an aqueous medium a resin composition comprising
   (A) 100 parts by weight of a cationic or anionic film-forming aqueous resin, and
   (B) 10 to 250 parts by weight of a thermosetting crosslinking agent which is self-crosslinked or crosslinked with said aqueous resin (A) in terms of condensation or addition reaction: parts by weight being based on the solid content of the resin composition
and then heating the resultant emulsion to above a crosslinkable temperature of said crosslinking agent.

3. The water-borne coating composition according to claim 1 wherein said crosslinked resin particles are prepared by dispersing or emulsifying
   (C) an ionic aqueous resin and
   (D) a resin having at least two polymerizable vinyl groups in one molecule in an aqueous medium and then radically polymerizing.

4. The water-borne coating composition according to claim 1 wherein said crosslinked resin particles are prepared by dispersing or emulsifying
   (E) a resin having ionic groups and at least two polymerizable vinyl groups in one molecule in an aqueous medium and then radically polymerizing.

* * * * *